United States Patent [19]

Andrews

[11] 4,273,616
[45] Jun. 16, 1981

[54] HIGH BURNUP NUCLEAR FUEL ROD

[75] Inventor: Mena G. Andrews, Newington, Conn.

[73] Assignee: Combustion Engineering, Inc., Windsor, Conn.

[21] Appl. No.: 23,438

[22] Filed: Mar. 23, 1979

[51] Int. Cl.³ .............................................. G21C 3/02
[52] U.S. Cl. ......................................... 176/68; 176/76
[58] Field of Search ............................. 176/68, 76, 78

[56] References Cited
U.S. PATENT DOCUMENTS

| 3,352,757 | 11/1967 | Dee et al. | 176/76 X |
| 3,378,457 | 4/1968 | Davidson et al. | 176/78 X |
| 3,519,537 | 7/1970 | Ferrari | 176/68 |
| 3,816,248 | 6/1974 | Cayol et al. | 176/76 X |
| 4,121,972 | 10/1978 | Steven | 176/68 |

Primary Examiner—Peter A. Nelson
Attorney, Agent, or Firm—L. James Ristas

[57] ABSTRACT

A nuclear fuel assembly having an improved fuel rod of the type having a column of hollow pellets. A plurality of spacer plugs are interposed between proximate pellets at selected elevations along the fuel rod in order to trap pellet debris that would otherwise fall through the passage in the center of the column and accumulate at the bottom of the fuel rod. Thus, an undesirable power peak at the bottom of the fuel rod is avoided. In the preferred embodiment, the plugs are located at the same elevations as the fuel assembly grids, where the local flux is lowest and the effect of the plugs on the power distribution is minimized. The plugs could be made from any material, but graphite or a low enrichment $UO_2$ pellet are preferred.

5 Claims, 1 Drawing Figure

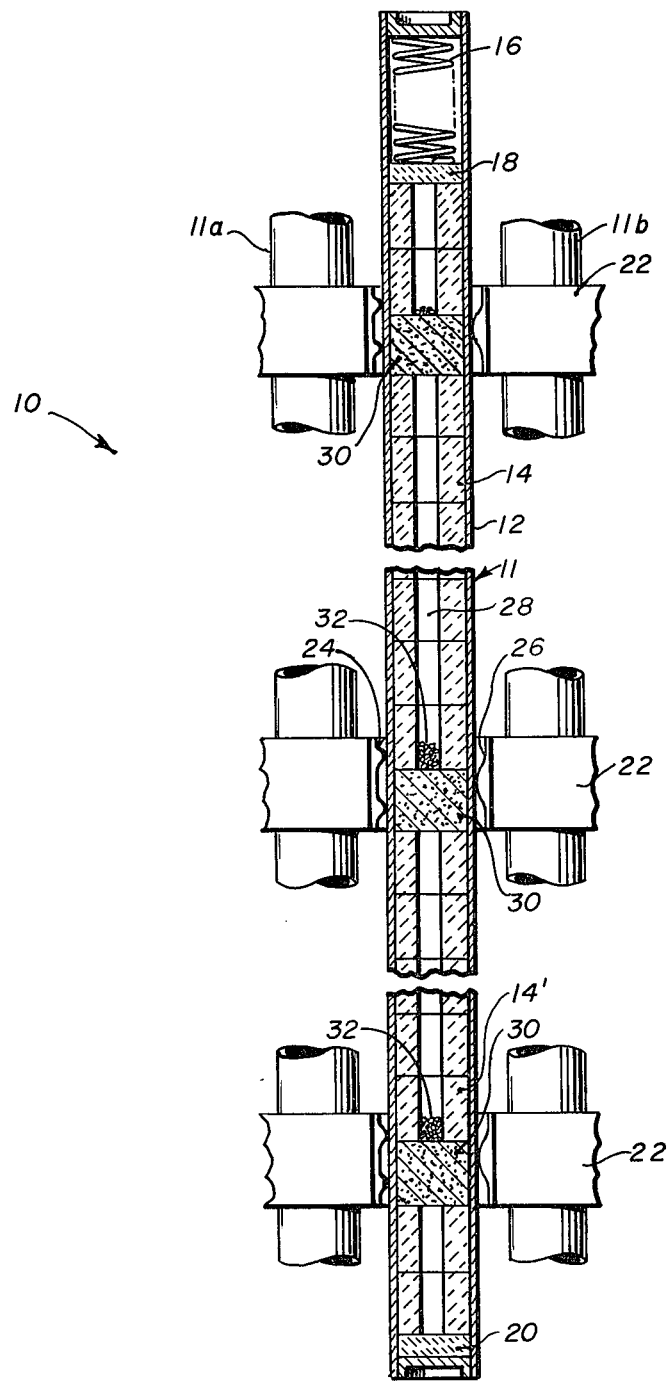

HIGH BURNUP NUCLEAR FUEL ROD

BACKGROUND OF THE INVENTION

This invention relates generally to nuclear reactors, and more particularly to nuclear fuel rods for water-moderated commercial reactors.

Current practice in water reactors is to use fuel rods having Zircaloy cladding encapsulating a column of uranium dioxide ($UO_2$) pellets in fuel assemblies where the fuel rods are spaced apart and supported by a plurality of grids. Typically, several of these grids are positioned axially along the full length of the fuel rods, which is typically 10 to 15 feet. The conventional $UO_2$ pellet is a solid cylinder with a variety of end shapes, usually dished and chamfered.

Recently, commercial nuclear power plant owners have found it advantageous to burn the nuclear fuel in longer cycles to improve the economics in view of the inability to reprocess spent fuel. One fuel pellet design which is known to permit extended burnup is in the form of a hollow cylinder. When stacked in columns of the type required for commercial water reactors, these hollow pellets form a long and continuous central passage within the fuel rod. During operation, the fuel pellets can crack, forming pellet debris which can enter the passageway and accumulate at the bottom of the fuel rod. If this debris deposit is sufficiently large, the redistribution of the $UO_2$ in the fuel rod could significantly affect the power distribution generated by the fuel rod. This redistribution is not desirable and may in some instances limit the operating level of the reactor.

SUMMARY OF THE INVENTION

The present invention solves this problem associated with using hollow fuel pellets in modern water reactors by locating spacer plugs at selected elevations along the pellet column to trap pellet debris that may fall through the passage. This prevents accumulation of debris at the bottom of the column, and reduces the shift in power distribution of the fuel rod.

The plugs are preferably located at the same elevations as the fuel assembly grids. Because the grids are typically parasitic thermal neutron absorbers, the grid locations usually operate at a depressed power level when compared to areas away from the grids. Thus, the perturbation in the physics characteristics of the fuel rod caused by the presence of the plug is minimized. In another embodiment, the plugs are made of graphite, which is a good neutron moderator. The addition of moderator helps restore some of the thermal neutron flux which has been depressed by the grids.

BRIEF DESCRIPTION OF THE DRAWINGS

The objects and advantages of the present invention will be more fully appreciated from the following description and FIGURE which shows a portion of a nuclear fuel assembly having the preferred embodiment of the invention.

DESCRIPTION OF THE PREFERRED EMBODIMENT

The FIGURE shows a portion of a typical pressurized water nuclear reactor fuel assembly 10 of the type more fully described in U.S. Pat. No. 4,059,483 issued Nov. 22, 1977, to Andrew J. Anthony, which is hereby incorporated by reference. The FIGURE shows a fuel rod 11 including a metal cladding 12 which encapsulates a column of hollow $UO_2$ pellets 14 which are maintained in firm axial alignment by the spring 16 located at the top of the fuel rod. Top and bottom insulators 18 and 20, respectively, help to thermally isolate the $UO_2$ pellets from the ends of the fuel rod. In modern commercial water-moderated reactors, a typical fuel rod 11 is approximately 14 feet long.

A typical reactor may have over 200 fuel assemblies, each assembly having a uniform array of over 200 fuel rods 11 and each rod being supported and spaced apart from adjacent rods 11a,11b by a plurality of axially spaced grids 22. Typically, a fuel assembly has about eight grids, each one to two inches in height, but for convenience, only three are shown in the FIGURE. Each grid 22 has means for retaining each fuel rod 11,11a,11b. Such means typically include a spring 24 which contacts the adjacent fuel rod 11 at two points to urge the rod against a hard stop 26. The retaining means 24, 26 and the rest of the grid 22 are typically made of material such as Zircaloy or Inconel. These metals are thermal neutron poisons, which parasitically absorb some of the thermal neutrons that are more desirably absorbed in the fuel pellets 14 to sustain the nuclear chain reaction. The grids 22 therefore produce slight flux depressions in the axial power distribution of each fuel rod 11.

It is believed that during operation of the nuclear reactor, the thermal cycling of the $UO_2$ pellets 14 and other factors contribute to the cracking of the pellets. Fuel material other than $UO_2$ may also experience such cracking, and the invention is applicable to these fuels as well. The resulting debris may enter the passage 28, which in the prior art was uninterrupted over the entire length of the fuel rod 11. If enough debris accumulates at the lower end of the rod 11, the localized increase in the amount of the fuel material can produce a significant power peak. This is particularly true in water-moderated commercial reactors where the fissile pellet column is on the order of 12 feet high, and a small debris contribution from each pellet 14 in the column can amount to a large deposit in the bottom of the fuel rod. The possibility that each fuel rod 11 could experience differing amounts of debris accumulation may result in an operating power level penalty either because of larger uncertainties that must be accounted for, or because the measured power distribution significantly differs from that predicted during the design of the fuel.

According to the present invention, spacer plugs 30 are interposed between proximate fuel pellets 14 at selected elevations in the fuel rod 11. Each plug 30 has a solid cross section at least as large as that of the passage 28 so that pellet debris 32 entering the passage 28 above the plug 30 will accumulate on the plug rather than falling to the bottom of the fuel rod. The plug preferably has a horizontal dimension similar to that of the fuel pellets 14 in order to avoid an adjacent pellet such as 14' from becoming cocked within the cladding 12 thereby increasing the stresses imposed by the fuel pellet 14' on the clad 12.

An excellent plug material is graphite, which is a good moderator of neutrons. This moderating property is particularly desirable near the grids 22 where the thermal neutron flux has been depressed. Thus, in the preferred embodiment a plug 30 is located in the same horizontal plane as each grid 22 thereby helping to increase the thermal neutron flux in the vicinity of the adjacent fuel pellets 14'. In the typical commercial water reactor, each fuel rod 11 would thus have eight plugs which would divide the fuel column into nine relatively isolated segments, thereby greatly reducing the debris deposit 32 that can accumulate at any location within the rod 11.

To assure that the pellet debris 32 will have the minimal effect on the axial power distribution of the fuel rod, the plug 30 should be located at substantially the same horizontal plane as the lower edge of the spacer grid 22 so that the debris 32 will form a deposit which remains within the upper and lower elevations of the grid. Since the flux is somewhat depressed between these elevations, the extra power generated by the debris 32 will not result in an excessive localized peak.

It is also contemplated that other plug materials may be used. In particular, plugs 30 made from $UO_2$ may be advantageous. Depending on the enrichment of the fuel pellets 14 and other factors commonly entering into the physics design of the fuel plugs 30 made from $UO_2$ may be required to have an effective enrichment lower than that of the fuel pellets 14. Of course, whether the plug 30 is made of graphite, low enrichment $UO_2$ or other fissile or fissionable pellets, or other material, the fuel assembly will contain less total enriched material than a conventional assembly not having the plug. This is not a significant disadvantage, however, since each fuel pellet being replaced in the conventional fuel rod was located next to a grid 22 and was therefore in a low importance location. Thus, the preferred embodiment of the present invention replaces the least important fuel pellets in each fuel rod with plugs 30 that provide a significant benefit in the avoidance of power distribution uncertainties and the associated licensing issues which would otherwise require extensive efforts to resolve.

I claim:

1. In a nuclear fuel rod having a column of vertically aligned, hollow fuel pellets contained within an encapsulating cladding such that a central passage is formed along the length of the column, the improvement comprising:
a spacer plug having a solid cross section at least as large as the passage, the plug being interposed between proximate fuel pellets at selected locations along the column, whereby any fuel pellet debris falling through the passage is trapped by the next lower spacer rather than accumulating at the bottom of the column.

2. The improved fuel rod recited in claim 1 wherein the plug has a horizontal thickness substantially equal to that of the fuel pellets.

3. The improved fuel rod recited in claim 1 wherein the spacer plug consists of a block of graphite.

4. The improved fuel rod recited in claim 1 wherein the spacer plug consists of a solid block of nuclear fuel material.

5. The improved fuel rod recited in claim 3 wherein the plug has a lower effective fissile enrichment than the fuel pellets.

* * * * *